United States Patent [19]

Clarkson et al.

[11] Patent Number: 4,846,442
[45] Date of Patent: Jul. 11, 1989

[54] GATE VALVE WITH LOCK RING

[75] Inventors: Curtis W. Clarkson; Larry F. Koll, both of Reno, Nev.

[73] Assignee: The Clarkson Company, Sparks, Nev.

[21] Appl. No.: 143,666

[22] Filed: Jan. 14, 1988

[51] Int. Cl.$^4$ .............................................. F16K 3/28
[52] U.S. Cl. .................................. 251/328; 251/359; 251/364
[58] Field of Search ................. 251/328, 358, 359, 364

[56] References Cited

U.S. PATENT DOCUMENTS

| 3,333,816 | 8/1967 | Williams et al. | 251/328 X |
| 4,257,447 | 3/1981 | Clarkson | 251/328 X |
| 4,688,597 | 8/1987 | Clarkson et al. | 251/328 X |

Primary Examiner—Arnold Rosenthal
Attorney, Agent, or Firm—Nies, Webner, Kurz & Bergert

[57] ABSTRACT

A packingless gate valve is disclosed which includes a housing having opposed similar housing halves with pipe nipples extending therefrom and with resilient sleeve units installed on respective lock rings mounted in recessed portions of the housing halves. The sleeves act to compressibly engage each other in the valve open condition and engage opposite sides of the gate in the valve closed condition. Each sleeve unit has a radially outwardly extending flange on the inner and outer axial ends with these flanges being located in indented regions between each lock ring and the respective housing half. An encircling thin stiffening ring of harder material is bonded to the axially outer surface of the flange on the inner end of each sleeve, each stiffening ring being shaped with a right angle bend so as to provide both axially and radially facing surfaces for each sleeve body. Each stiffening ring is engaged with the respective lock ring along the entire length of the stiffening ring. The particular configuration and position of the sleeve units with the lock rings and stiffening rings has been found to function advantageously in maintaining proper operation of the gate valve. The gate valve construction of the present invention results in no leakage to the outside when the valve is fully open and no leakage to the outside or past the gate internally when the valve is fully closed.

29 Claims, 2 Drawing Sheets

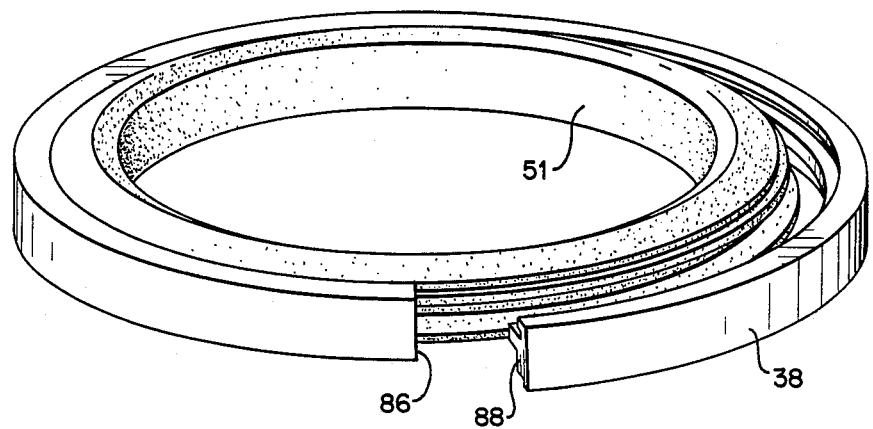
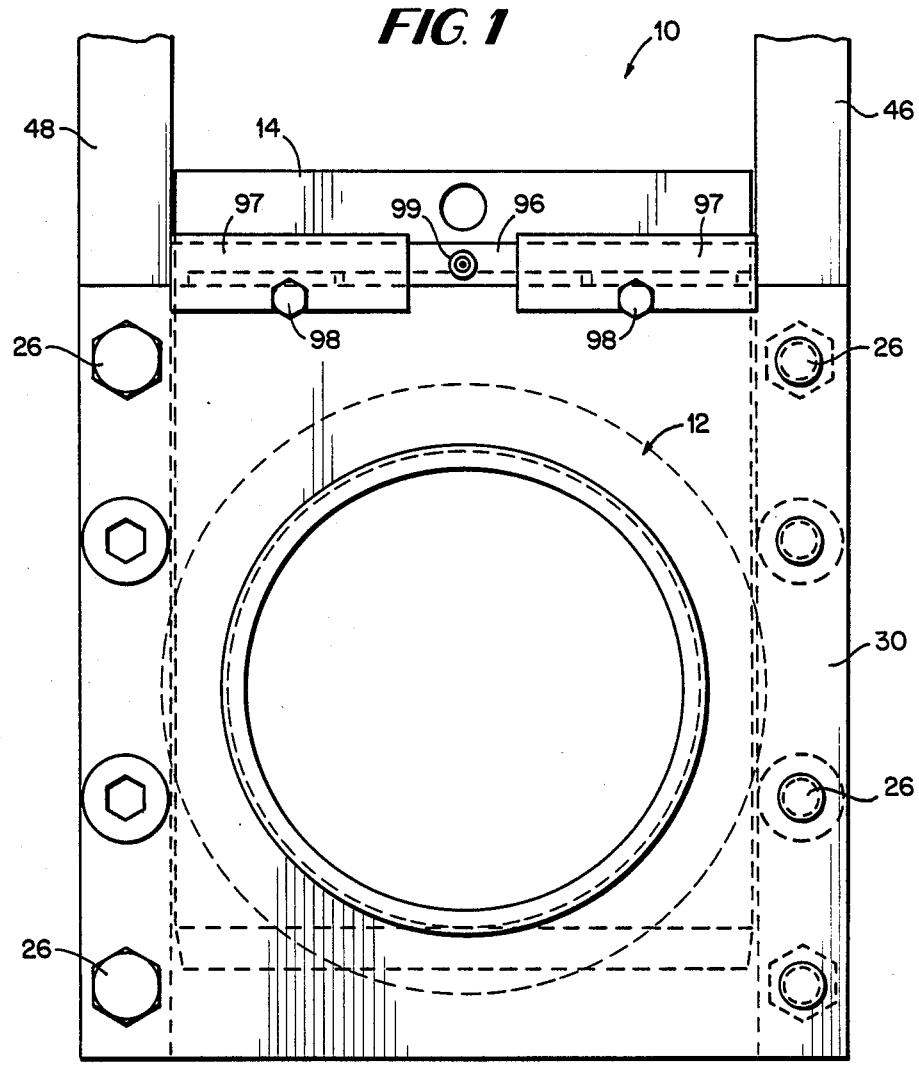

GATE VALVE WITH LOCK RING

BACKGROUND AND SUMMARY OF THE INVENTION

The present invention relates to packingless gate valves and more particularly to a knife gate valve having pipe nipples extending from each end of the valve body for use in attachment of the valve to the piping system and with a specific construction of internal components including an elastomer sleeve with stiffener ring mounted in a lock ring so as to result in improved operation in sealing of the gate. The valve of the present invention may be used for any of various fluid control operations.

The gate valve of the present invention is an improvement of the gate valves as described in previous Clarkson patents, including U.S. Pat. Nos. 3,945,604; 4,007,911; 4,257,447; and 4,688,597.

The present invention provides an improved construction as compared to the gate valves of the previous patents by a special arrangement of the sleeve structure and stiffener ring mounted in a lock ring at opposite sides of the gate having novel coaction with the gate and mounted in a novel manner in the valve housing.

Accordingly, it is an object of the present invention to provide a novel gate valve assembly wherein resilient sleeve units at opposite sides of the gate are mounted in a special manner in the valve housing and have special coaction with the relatively slidable gate.

A further object of the invention is to provide a novel gate valve assembly wherein the inner ends of axially compressed sleeve units engage opposite sides of the gate in the valve closed condition and sealingly engage in the valve opening condition, and are of special structure as mounted in a lock ring installed in each housing half so as to provide improved coaction between the sleeve units and the gate.

Another object of the invention is to provide a novel gate valve assembly wherein each sleeve end at the gate is of a specific configuration and with a lock ring of novel construction and location being provided to maintain the sleeve in position when the gate is opening or closing.

Another object of the invention is to provide a novel gate valve assembly wherein opposed sleeve units under axial compression are coaxially mounted in a novel manner in a valve housing.

Further objects of the invention will be apparent from the following description as taken with the appended claims and the accompanying drawings.

BRIEF DESCRIPTION OF THE DRAWINGS

FIG. 1 is an end elevation showing a gate valve assembly according to the present invention.

FIG. 4 is an enlarged perspective view showing a gate valve sleeve installed in a lock ring in accordance with the present invention.

DESCRIPTION OF THE PREFERRED EMBODIMENTS

Figure 3:
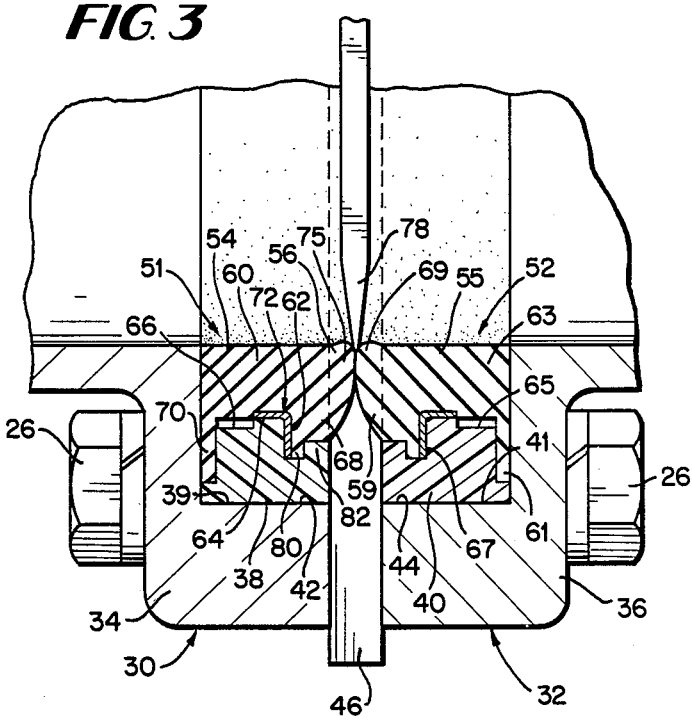
FIG. 3 is a partial elevation in cross section showing the valve components at the lower end of the assembly.

In the illustrated embodiment of the invention as shown in FIGS. 1 through 4, there is provided a valve assembly 10 which includes a housing 12 adapted to be inserted coaxially into a pipeline. A gate actuator of any conventional type may be mounted on the housing 12.

The movable valve element is in the form of a flat smooth imperforate gate plate 14 of uniform thickness mounted for reciprocal movement in and out of the fluid flow path through the housing. The gate 14 is shown in two positions, an open and a closed position, in FIG. 2. Upon operation of a suitable actuator, such as a piston and cylinder arrangement, an electric drive motor or a handwheel, the gate 14 may be moved vertically or horizontally, depending on orientation of the pipeline, between position 14a and position 14b of FIG. 2 to be described in more detail hereinafter. Further description of the actuator and its function is not necessary to an understanding of the invention which relates essentially to the valve structure within the housing and its cooperation with the gate 14.

Housing 12 includes opposed similar halves 30 and 32 having respective housing plates 34 and 36 each with pipe nipple portion 35, 37 extending axially outwardly. Each nipple portion 35, 37 has a respective groove 43, 45 which extends circumferentially around the exterior thereof. The valve assembly 10 may be connected to adjacent piping by couplings which seat in these grooves 43, 45 in the pipe nipples 35, 37. One such coupling 90 which may be employed is shown in phantom lines in FIG. 2 as seated in groove 45 of nipple 37 and also in groove 92 of adjacent pipe section 94. In an alternative embodiment, the pipe nipples are provided without grooves and a suitable coupling is employed for use with plain end piping systems.

The housing halves are rigidly secured together as by a series of bolts 26 extending through the adjacent housing plates. The housing plates 34, 36 abut flush upon the opposite sides of two flat uniform thickness spacer strips 46 and 48, which are disposed between the housing halves at opposite sides to maintain between them a narrow space of sufficient width to pass gate 14 during operation of the valve. In this respect, the housing is similar to that of the above mentioned U.S. Pat. No. 4,688,597 which is incorporated by reference and to which reference is made for further detail. This gate passage or chamber space dimension is of a fixed width slightly greater than the width of gate 14 when the bolt assemblies 26 are drawn tight. The housing halves are preferably cast steel, making each body half and the respective extended nipple a single part.

Sealing sleeve units 51 and 52 are mounted in the housing halves within respective lock rings 38, 40. Each lock ring 38, 40 is an annular, cylindrical-shaped member formed of hard plastic or other suitable material, with a respective smooth radially outwardly surface 39, 41 which fits snugly within recessed axially inner portion 42, 44 of the respective housing plates 34, 36.

Sleeve unit 51 comprises an annular resilient body 54 of an elastomeric material such as natural rubber or other suitable elastomer such as polyurethane and is of substantially uniform radial cross section at its inner end 56. On the radially outer surface of sleeve mid-body portion 60, the sleeve 51 is reinforced by an annular shaped stiffener ring in the form of an annular strip or band 62 bonded securely thereto around a portion of its outer periphery. Where ring 62 is of thin metal, such as steel, it is vulcanized to the rubber body. Preferably ring 62 is of stainless steel to be rustproof. In some instances ring 62 may be of hard polyurethane or equivalent plastic. The outer diameter of ring 62 is cylindrical and an effective continuation of the adjacent cylindrical outer surface of body 54 and it has a smooth fit within machined surface 64 so that sleeve unit 51 is accurately coaxially mounted in the assembly. It will be noted that space 66 surrounds sleeve body 54 and extends between the lock ring 38 and the radially outer part of sleeve body 54 when the sleeve is mounted in housing half 30.

Sleeve body 54 has two thin integral radial flanges 68, 70 with one flange 68 being located adjacent the stiffener ring 62 and with the other being an integral radial flange 70 formed on the axially outer end of the body 54 of the sleeve. Sealing beads may be provided circumferentially around the sleeve body 54 on the axially outer end surfaces of body 54 and flange 70 to provide a tighter seal against the adjoining housing plate 34.

At its inner axial end, stiffener ring 62 extends along the axially outer face of sleeve flange 68, then forms a right angle bend 72 and extends along the radially outer face of midbody portion 60, terminating adjacent the axially inner end of the recessed portion 66 located radially outwardly of the sleeve body 54 between the inner rib 76 of the lock ring 38 and flange 70. Rib 76 is an axially inner circular rib which provides a smooth cylindrical surface for engaging with stiffener ring 62. Axially inwardly of the rib 76, a recessed portion or notch 80 is provided which extends radially outwardly, with the notch 80 being of sufficient depth so that the portion of the stiffener ring 62 which extends along the axially outer face of sleeve flange 68 will have the radially outer end thereof terminate at the bottom end of said notch 80. The presence of the notch 80 results in a radially inwardly projecting rib 82 at the extreme axially inner end of the lock ring 38.

Flange 68 extends radially outwardly to provide a seat for the axial inner leg of ring 62 and also to engage the radial inner end of lock ring 38 including the rib 82 and notch 80. From its inner point of contact with lock ring 38, the radially inward portion of sleeve body 54 is formed with an axially inwardly extending rounded end annular lip 75 disposed at the inner periphery of the sleeve 51. Lip 75 extends radially inwardly from the contact with lock ring 38 so that the axially inner periphery of the lip 75 forms an angle such as about 30 degrees relative to the diameter of the sleeve body 51. This angle extends for approximately one-half the radial length of the lip 75, with the remainder of the lip 75 being of a generally rounded configuration, as shown in FIG. 3. Lip 75 when relaxed extends substantially farther axially inwardly than the vertical axis of the gate 14. Thus the lip 75 of sleeve unit 51 and the corresponding lip 69 of sleeve unit 52 will actually compress against each other or against the gate.

As shown in FIG. 3, sleeve 51 is also formed at its axially outer end with a thin integral radial flange 70 which fits into a recess between the lock ring 38 and the housing plate 34. When the parts are in assembly with the sleeve 51 mounted on the lock ring 38 before introduction into the housing half 30, flange 70 bulges slightly axially outwardly of the lock ring 38 but when the housing halves are secured together by the bolts 26, sleeve flange 70 is compressed between housing plate 34 and the lock ring 38.

Sleeve unit 52 is similar to sleeve unit 51, having an annular resilient body 55 and carrying a bonded annular metal stiffener strip or ring 67 at its radially outer surface which ring extends along the axially outer face of sleeve flange 59, then forms a right angle bend and extends along the radially outer face of mid-body portion 63, terminating adjacent the axially inner end of the recessed portion 65 located radially outwardly of the sleeve body 55 between the inner rib 57 of the lock ring 40 and outer flange 61. Axially inwardly of ring 67 the resilient body 55 is formed with an axially inwardly extending rounded end lip 69 similar to lip 75. The sleeve body 55 for sleeve unit 52 is of similar cross sectional structure as sleeve unit 51 and has integral radial flanges 59, 61 which correspond to flanges 68, 70 of sleeve unit 51. Sleeve body 55 also may have sealing beads in the same manner as sleeve body 54. The lock ring 40 is of identical construction to lock ring 38 and interengages with sleeve 52 in the same manner that lock ring 38 interengages with sleeve 51.

In practice, sleeve units 51 and 52 and the respective housing plates, lock rings and stiffener rings may be identical and interchangeable, so that inventory may be held to a minimum.

Figure 2:
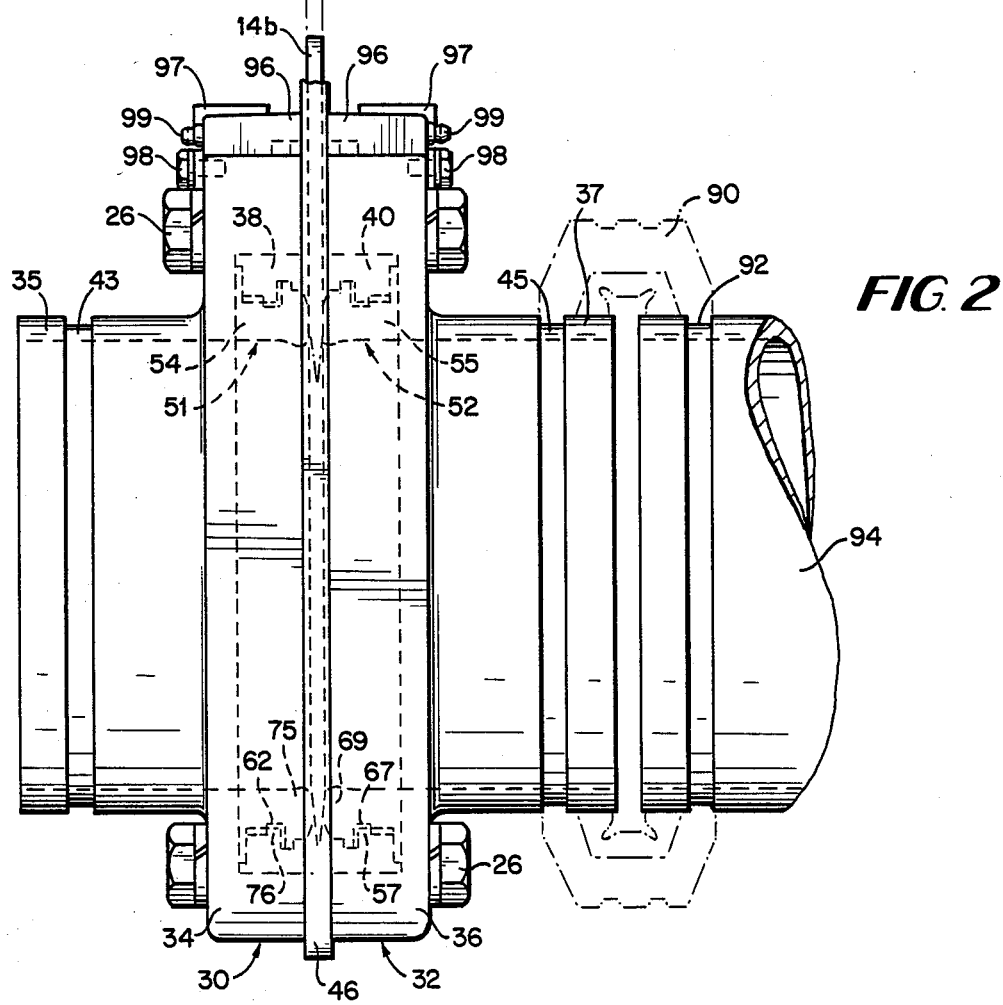
FIG. 2 is a side elevation of the gate valve assembly of the present invention showing the valve as installed on a section of pipe.

When the sleeve units 51 and 52 are mounted within the housing, with the housing halves bolted together and installed in a pipeline, the parts are positioned as shown in FIG. 2, so that sleeve end lips 69 and 75 are coaxially aligned and preferably in light compressive contact prior to contact by the gate 14. The distance from the intersection of lip 75 and lock ring 38 to the intersection of lip 69 and lock ring 40 is greater than the thickness of the gate plate 14.

The lower edge of the gate plate 14 is tapered to provide a relatively sharp straight knife edge as shown at 78, and initially in the valve open condition does not extend far enough to appreciably forcibly engage lips 69, 75.

Figure 5:
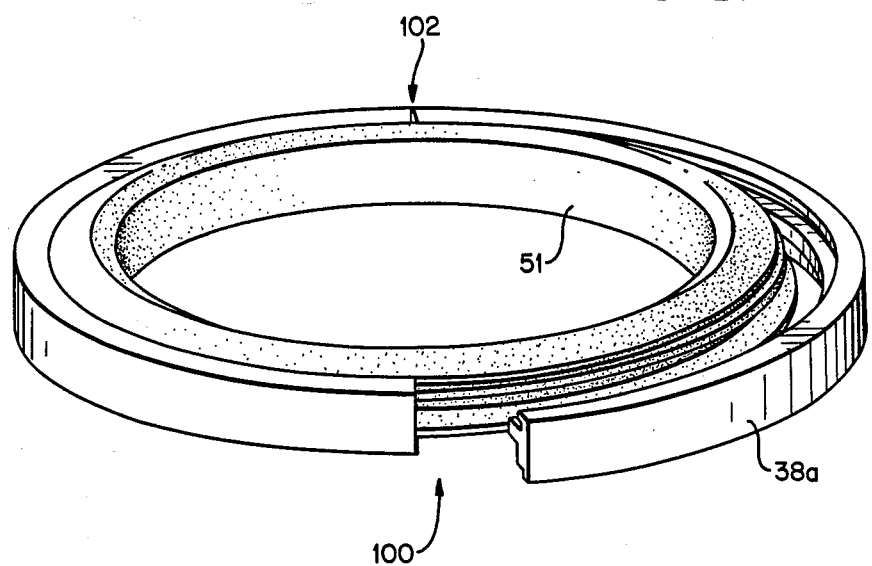
FIG. 5 is a perspective view of an alternative embodiment of the invention shown in FIG. 4.

In the assembly of the present gate valve, the sleeves 51, 52 are first installed on their respective lock rings 38, 40 which are split to provide end portions which, due to the pliable nature of the plastic material, may be separated to allow each lock ring to fit circumferentially around the respective sleeve. Thus as shown, for example, in FIG. 4, the plastic lock ring 38 has end portions 86, 88 which may be separated manually to allow the lock ring 38 to be fitted around the sleeve 51, after which the lock ring 38 is closed up around the sleeve 51 so that the ring end portions 86, 88 meet in close contact. Alternatively, as shown in FIG. 5, a metal lock ring 38a split in two places 100, 102 on opposite sides of the circumference to provide two halves may be employed, with the two halves clamping around the sleeve. The lock rings 38, 40 with installed sleeves 51, 52 are next mounted within recessed portions 42, 44 of the respective housing plates 34, 36 and the spacers 46, 48 are installed on either side. The two housing halves are then bolted together in the open position relative to the gate 14.

As shown in FIG. 2, upon actuation of the gate 14, the gate moves downwardly through the positions shown at 14a and 14b. As it does so, the descending gate 14 lower edge enters and forces apart the upper sector of the sleeve 51, 52 as it is slidably disposed between the sleeve end faces and then forces apart the lips 69 and 75. A pair of wiper devices 96 are attached to the upper end of the housing 12 by wiper clamps 97 secured by bolts 98. The wipers 96 function to wipe clean the sides of the gate 14 each time it moves downwardly to the closed position. Grease fittings 99 are employed for maintenance of the wiper devices 96.

As the gate 14 moves down, each of the stiffener rings, due to the ring positions being relatively surrounded by the compressible sleeve material, functions somewhat as a fulcrum to relieve some of the sealing compression between lips 69 and 75 so that the tapered lower knife edge of the gate may more easily separate the lips. In so doing, the sleeve moves into the space surrounding the gate and this action pulls the sleeve material back from the area of the lips 69, 75. This in turn reduces friction between the downwardly moving gate, which is slidably guided between the sleeve end faces and the opposing lips. Excess sleeve material may also displace into recesses 65, 66. By such overall action, the stiffener rings thereby provide for good smooth reduced friction sliding contact between the sleeves 51, 52 and the gate 14.

It is has been found that the particular configuration and position of the stiffener rings 62, 67 results in two primary advantages: (1) the rings prevent the pliable sleeve material from following the gate 14 as it penetrates between the lips 69, 75. Without the rings 62, 67 the sleeves tend to grip the gate and follow it into the closed position; and (2) the axially extending portion of the stiffener rings helps to align the sleeves with the lock rings and housing plates, thus making each sleeve concentric with the respective lock ring and housing plate and also serving to align the two sleeves with each other, thus providing for a smooth gate closing and opening action. Also the solid contact between each stiffener ring and the respective adjacent lock ring provides a reinforced structure which results in smoother gate operation.

As the gate 14 penetrates further toward the closed position, the seal between lips 69 and 75 is progressively parted while the relatively soft sleeve material effectively flows around the knife edge. The combination of the knife edge and the gate and the soft flexible material of the sleeve lips minimize leakage from the valve during gate closing and opening operations. In this regard, a most important advantage of the gate valve construction of the present invention is that there is no leakage to the outside when the valve is fully open and no leakage to the outside or past the gate internally when the valve is fully closed.

As the gate reaches the final closed valve position, the knife edge has passed the lower sector of the seal lips 69 and 75 and the gate is disposed between them, while the knife edge projects into the space below. At this time the opposed flat smooth side surfaces of the gate plate 14 are uniformly engaged under compression by the compressed seal lips, which may even be substantially flattened as shown, so that there is a complete annular seal of good radial extent within the valve. At this time the seal lips are in uniform maximum compression and the internal pressure of the fluid or slurry in the pipeline will further force the upstream sleeve lips into engagement with the gate 14, so that there is no leakage in the valve closed position, this action being aided by the inner surface portion of the sleeve.

In the gate closed condition, the area of the gate 14 that is unsupported is minimized by the present invention so that a maximum pressure rating for the valve can be obtained. In this regard, a critical dimension is the diameter of the stiffener rings as measured at the radially outermost point of the rings.

During movement of the gate 14 from the closed position to the open position, substantially the reverse of the above described procedure takes place, the resiliency of the seal material maintaining sealing sliding contact between the lips 69, 75 and the gate 14 until the gate 14 is withdrawn from between the lips.

The valve of the invention is a two-way valve, that is it may control flow in either direction in the pipeline and may be reversed end for end. The sleeve units 51 and 52 are essentially identical so that either may be reversed and function as described above in the assembly. The individual sleeve units are readily removed and replaced when damaged or worn.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A gate valve assembly comprising two body housing members having coaxial through passages and being secured together in end to end relation, each of said passages being defined by a housing plate, and with each housing plate having an annular recessed portion in the axially inner end portion thereof adjacent said passages, with means to define a relatively narrow transverse gate chamber, in which an imperforate gate is slidable between a valve open position in which the gate does not block fluid flow through the passages, and a closed position in which the gate is interposed between the passages, an annular lock ring mounted in said annular recessed portion of each housing plate, a unitary annular sealing sleeve unit mounted on each lock ring and lining each of said passages whereby each sleeve unit has an inner end extending into the chamber and an outer end remote from the chamber and abutting a respective housing plate, and with each sleeve unit having a mid-body portion between said inner end and said outer end, with each of the sleeve units extending into the chamber in the form of annular resilient lips adapted to sealingly engage each other under compression in the open position of the valve, but with the gate between the lips when the valve is closed, each of said sleeve inner and outer axial ends having a flange extending radially outwardly therefrom; said flanges engaging inner and outer side wall surfaces of a respective lock ring, each of the sleeve units being in the form of an axially compressible annular body of elastomeric material which is uniformly resilient throughout its volume without a separate internal reinforcing member, and with an encircling thin stiffening ring of harder material bonded to the axially outer surface of the flange on the inner end of each sleeve and being adjacent said lock ring, each stiffening ring being shaped with a right angle bend so as to have an axially outwardly extending portion which is bonded to and extends along the radially outer face of the mid-body portion of said sleeve, thus providing both axially and radially facing surfaces for each sleeve body between said sleeve body and said lock ring.

2. The gate valve assembly of claim 1 wherein each housing plate has an elongated nipple portion which extends axially outwardly.

3. The gate valve assembly of claim 1 wherein a recessed portion is provided between each sleeve body and the respective lock ring, said recessed portion extending axially from a position adjacent the axially outer end of said stiffening ring to said flange on the outer axial end of each sleeve body.

4. The gate valve assembly of claim 3 wherein said lock ring has a raised axially inner rib which extends radially inwardly of the remainder of said lock ring and abuts said stiffening ring, said rib serving to define the axial inner end of said recessed portion.

5. The gate valve assembly of claim 1 wherein each lock ring is provided with indented portions on the axially inner and outer end portions for receiving the inner and outer flanges of a respective sleeve.

6. The gate valve assembly of claim 5 wherein said axially inner indented portion of each lock ring has a recessed portion on the axially outer end thereof which extends radially outwardly, said recessed portion of each lock ring being of sufficient length so as to receive the radially outer portion of the respective stiffener ring as well as a portion of a respective sleeve.

7. The gate valve assembly of claim 1 wherein said stiffener ring is positioned adjacent said lock ring along the entire length of said stiffener ring.

8. The gate valve assembly of claim 6 wherein said stiffener ring is positioned adjacent said lock ring along the entire length of said stiffener ring.

9. The gate valve assembly of claim 1 wherein each lock ring has a generally smooth surface around the radially outer circumference thereof.

10. The gate valve assembly of claim 2 wherein a groove is provided circumferentially in the outer surface of the elongated nipple portion of at least one body housing member.

11. The gate valve assembly of claim 1 wherein said stiffening rings are formed of stainless steel.

12. The gate valve assembly of claim 1 wherein said stiffening rings are formed of hard polyurethane.

13. The gate valve assembly of claim 1 wherein at least one lock ring is of a pliable material and is split transversely at one point along the circumference thereof to provide end portions which may be separated to allow said lock ring to be fitted circumferentially around the respective sleeve.

14. The gate valve assembly of claim 6 wherein at least one lock ring is of a pliable material and is split transversely at one point along the circumference thereof to provide end portions which may be separated to allow said lock ring to be fitted circumferentially around the respective sleeve.

15. The gate valve assembly of claim 1 wherein at least one lock ring is of a metal material and is split in two places on opposite sides of the circumference thereof to provide two halves which clamp around the sleeve.

16. A sleeve unit for a gate valve comprising an annular lock ring and a unitary annular sealing sleeve mounted on said lock ring and extending radially inwardly thereof, and means for interengaging said sleeve with said lock ring to maintain said sleeve and lock ring in a fixed position relative to each other, said sleeve having a radially outwardly extending flange on the inner axial end of said sleeve, and with an encircling thin stiffening ring of harder material bonded to the axially outer surface of said flange, said sleeve having a mid-body portion between the inner and outer axial ends thereof and wherein said stiffening ring is shaped with a right angle bend so as to have an axially outwardly extending portion which is bonded to and extends along the radially outer face of said mid-body sleeve portion, thus providing both axially and radially facing surfaces for said sleeve between said sleeve and said lock ring.

17. The sleeve unit of claim 16 wherein said means for interengaging said sleeve with said lock ring includes indented portions on the axially inner and outer ends of said lock ring and with each of the inner and outer axial ends of said sleeve having a flange extending radially outwardly therefrom, said flanges being positioned in the indented portions of said lock ring so as to engage side wall surfaces of said lock ring.

18. A sleeve unit for a gate valve comprising an annular lock ring and a unitary annular sealing sleeve mounted on said lock ring and extending radially inwardly thereof and means for interengaging said sleeve with said lock ring to maintain said sleeve and lock ring in a fixed position relative to each other, said means for interengaging said sleeve with said lock ring including indented portions on the axially inner and outer ends of said lock ring and with each of the inner and outer axial ends of said sleeve having a flange extending radially outwardly therefrom, said flanges being positioned in the indented portions of said lock ring so as to engage side wall surfaces of said lock ring.

19. The sleeve unit of claim 18 wherein said sleeve is in the form of an axially compressible annular body of elastomeric material which is uniformily resilient throughout its volume.

20. The sleeve unit of claim 18 wherein an encircling thin stiffening ring of harder material is bonded to the axially outer surface of the flange on the inner end of each sleeve so as to be adjacent said lock ring.

21. The sleeve unit of claim 20 wherein said sleeve has a mid-body portion between the inner and outer axial ends thereof and wherein said stiffening ring is shaped with a right angle bend so as to have an axially outwardly extending portion which is bonded to and extends along the radially outer face of said mid-body sleeve portion, thus providing both axially and radially facing surfaces for said sleeve between said sleeve and said lock ring.

22. The sleeve unit of claim 20 wherein a recessed portion is provided between said sleeves and the lock ring, said recessed portion extending axially from a position adjacent the axially outer end of said stiffening ring to said flange on the outer axial end of said sleeve.

23. The sleeve unit of claim 22 wherein said lock ring has a radially axially inner rib which extends radially inwardly of the remainder of said lock ring and abuts said stiffening ring, said rib serving to define the axial inner end of said recessed portion.

24. The sleeve unit of claim 20 wherein said axially inner indented portion of said lock ring has a recessed portion on the axially outer end thereof which extends radially outwardly, said recessed portion of said lock ring being of sufficient length so as to receive the radially outer portion of the stiffener ring as well as a portion of the sleeve.

25. The sleeve unit of claim 20 wherein said stiffener ring is positioned adjacent said lock ring along the entire length of said stiffener ring.

26. The sleeve unit of claim 18 wherein said lock ring has a generally smooth surface around the radially outer circumference thereof.

27. The sleeve unit of claim 18 wherein said lock ring is of a pliable material and is split transversely at one point along the circumference thereof to provide end portions which may be separated to allow said lock ring to be fitted circumferentially around the sleeve.

28. The sleeve unit of claim 18 wherein said lock ring is of a metal material and is split in two places on opposite sides of the circumference thereof to provide two halves which clamp around the sleeve.

29. A gate valve assembly comprising two body housing members having coaxial through passages and being secured together in end to end relation, each of said passages being defined by a housing plate, and with each housing plate having an annular recessed portion in the axially inner end portion thereof adjacent said passages, with means to define a relatively narrow transverse gate chamber, wherein a gate is slidable between a valve open position in which the gate does not block fluid flow through the passages, and a closed position in which the gate is interposed between the passages, an annular lock ring mounted in said annular recessed portion of each housing plate, a unitary annular sealing sleeve unit mounted on each lock ring and lining each of said passages whereby each sleeve unit has an inner end extending into the chamber and an outer end remote from the chamber and abutting a respective housing plate, each of the sleeve units being in the form of an axially compressible annular body of elastomeric material, and with each of said sleeve inner and outer axial ends having a flange extending radially outwardly therefrom, said flanges engaging inner and outer side wall surfaces of a respective lock ring.

* * * * *